United States Patent [19]
Nagelmann et al.

[11] Patent Number: 5,784,439
[45] Date of Patent: Jul. 21, 1998

[54] METHOD AND SYSTEM FOR REMOTE DIAL-UP ATM

[75] Inventors: Frank Nagelmann, Alamo; Wayne Averill, Moraga, both of Calif.

[73] Assignee: Cash on Demand, Inc., Walnut Creek, Calif.

[21] Appl. No.: 881,556

[22] Filed: Jun. 24, 1997

Related U.S. Application Data

[63] Continuation of Ser. No. 334,875, Nov. 4, 1994, abandoned.

[51] Int. Cl.[6] .................................................. H04M 11/00
[52] U.S. Cl. .............................. 379/91.01; 379/93.12; 902/39; 235/379
[58] Field of Search ........................ 235/379, 380, 235/381; 902/8, 14, 22, 39; 395/500; 705/42, 43; 379/90.01, 91.01, 91.02, 93.01, 93.05, 93.12, 93.26

[56] References Cited

U.S. PATENT DOCUMENTS

| | | | |
|---|---|---|---|
| 4,114,027 | 9/1978 | Slater et al. | 235/379 |
| 4,390,968 | 6/1983 | Hennessy et al. | 235/379 |
| 4,630,200 | 12/1986 | Ohmae et al. | 235/379 |
| 4,972,463 | 11/1990 | Danielson et al. | 379/91 |
| 5,025,373 | 6/1991 | Keyser, Jr. et al. | 364/408 |
| 5,202,976 | 4/1993 | Hansen et al. | 395/500 |
| 5,220,501 | 6/1993 | Lawlor et al. | 364/408 |
| 5,233,640 | 8/1993 | Kostusiak | 379/39 |
| 5,285,382 | 2/1994 | Muehlberger et al. | 364/401 |
| 5,311,576 | 5/1994 | Brunson et al. | 379/89 |
| 5,340,967 | 8/1994 | Martin et al. | 235/379 |

OTHER PUBLICATIONS

Letter (1 page) dated Jun. 10, 1996 from Paul Wallner to Robert O. Guillot.
Letter (2 pages) dated Jun. 6, 1996 from John Marshall to Robert O. Guillot with attachment A (1 page), attachment (1 page), attachment B (2 pages), attachment C (2 pages).
Interbold, "Dial–up ATM Product Summary" dated 22 Apr., 1996; particularly p. 3, paragraph 1–4.
Letter for Michael K. Kelly dated May 6, 1996 with Exhibits C–S.

*Primary Examiner*—Curtis A. Kuntz
*Assistant Examiner*—Stephen W. Palan
*Attorney, Agent, or Firm*—Robert O. Guillot

[57] ABSTRACT

A remote dial-up ATM system having a host emulator located proximate to an ATM and directly connected thereto, separated by a dial-up telephone connection, from an ATM emulator located proximate to the host and directly connected thereto. The host emulator maintains the on-line status of the ATM at the ATM site. The ATM emulator maintains the on-line status of the host. This configuration creates a virtual dedicated circuit linking the ATM and the host via a dial-up telephone connection.

22 Claims, 1 Drawing Sheet

METHOD AND SYSTEM FOR REMOTE DIAL-UP ATM

This application is a continuation of application Ser. No. 08/334,875 filed Nov. 4, 1984, now abandoned.

BACKGROUND

1. Field of Invention

The present invention relates to a method and system for connecting fully functional (including cash disbursing and deposit accepting) remote automatic teller machines (ATMs) via a dial-up telephone connection to a host computer.

2. Description of Prior Art

The ATM and its associated ATM card have evolved from a way to reduce teller requirements in bank lobbies to an integral part of American banking life. Today there are 475 Million bank cards in circulation. There is a real and growing demand for ATMs in retail environments. However, the standard industry practice of using high cost dedicated data circuits and remote ATM logistics including cash restocking, deposit removal, periodic maintenance, and servicing have made remote ATM deployment for merchants and even some bank branches spotty at best.

The market place has driven partial solutions to the remote ATM problem. The major solution has been the creation of interconnected regional and international ATM networks so a client of a particular bank on the interconnected networks can, generally for a fee, use the ATMs of any of the banks on the network. However, the customer is still generally forced to go to a bank.

Another partial solution has been the use of the ATM card for point-of-sale (POS) transactions. POS transactions can use either a credit card or a debit card. In a routine POS transaction, a customer's credit card is scanned at the merchant's location. The information from the credit card and the amount of credit sought is transmitted over a POS network to the credit card issuer's central computer which verifies the availability of credit and then performs a debit and credit reconciliation by appropriate adjustment of the customer's and merchant's accounts. In a POS transaction using an ATM card, POS networks route the POS transaction to the appropriate regional ATM network to debit the ATM card holder's bank account and credit the merchant's bank account. Instead of a credit card, the ATM card merely acts as a debit card.

SUMMARY OF INVENTION, OBJECTS AND ADVANTAGES

Most ATMs are connected by an internal bank network routed to a central computer (a "host" or "host computer") of a financial institution or a shared host computer of a group of financial institutions. Host computers are sometimes interconnected to form a host network. ATMs are polled by their host at regular intervals for data. If an ATM is not polled for a certain period of time or the communication connection is broken, the ATM shuts down and must be restarted by commands from the host. The polling relationship between ATMs and their host requires continuous communications through a dedicated line. This makes dial-up communications impossible.

Host networks are interconnected through regional, national and international ATM networks such as Cirrus® and Plus System® and regional networks such and Star System®, Pulse®, Alert®, Honor®, NYCE®, MagicLine®, Tyme®, Shazam® and Minibank® ("inter-host networks").

This permits an ATM card user of any host network (a "client") to use, for a fee, all ATMs of all financial institutions on the inter-host network if he is a client of any one financial institution. To cross between host networks, the host identifies the ATM card user as a non-client and passes the transaction data on to an inter-host network for routing to the host where the ATM card user is a client. A standard host thus has two functions; processing its client's ATM data or passing its non-client's ATM data on to an inter-host network.

The present invention is the configuration of a host emulator located proximate to an ATM and directly connected thereto, separated by a dial-up telephone connection from an ATM emulator located proximate to the host and directly connected thereto. The increasing affordability of computing power makes smart remote terminals cost effective and the present invention possible.

The host emulator maintains the on-line status of the ATM at the ATM site. The ATM emulator maintains the on-line status of the host. When a client inserts his ATM card, the host emulator dials the ATM emulator at the host site, thus creating a virtual dedicated circuit linking the ATM to the host via the switched network. The ATM is identified by the host, and maintains direct communications with the ATM until the transaction is completed. By this configuration, a polling relationship between industry standard ATMs and the host is emulated; however, the ATM can now use a dial-up telephone line to connect with a host computer only when needed to process a client's transaction.

Several objects and advantages of the present invention are:

(a) The invention eliminates the cost of dedicated lines for ATM data transactions.

(b) The invention permits installation of ATMs without installation of dedicated lines, dedicated networks or dedicated host computers.

(c) The invention permits greater competition to provide ATM's services to more customers at more locations through greater flexibility to share revenues with merchants.

(d) The invention permits ATM service in more marginal foot traffic locations.

(e) The ATM relies on the switched network, and consequently has higher reliability since the ATM can take advantage of back-up or alternate routing algorithms typical of switched networks.

(f) The invention speeds installation time and lowers installation cost.

Still further objects and advantages will become apparent from a consideration of the ensuing description and drawings.

DRAWING FIGURES

REFERENCE NUMERALS IN DRAWINGS

1. An industry standard automatic teller machine (ATM) with standard 9600 baud modem.

2. A digital connector from the ATM to a minimum function computer network access controller (MFNAC).

3. A minimum function computer network access controller (MFNAC).

4. A dial-up telephone connection (a switched network).

5. A network access controller (NAC) of a commercial computer network exchange service with access to ATM networks.

6. An ATM network.

7. A host computer to the ATM in communication to the ATM network carrying the ATM's data.

8. A 9600 baud modem.

9. A 1200 baud modem.

10. A dial-up interface employing a SNA/SDLC (IBM® System Network Architecture/Synchronous Data Link Control) protocol.

11. External power supply module.

12. Internal lithium battery.

13. A host emulator at the MFNAC.

14. An ATM emulator at the NAC.

Description - FIGS. 1-4

Figure 1:
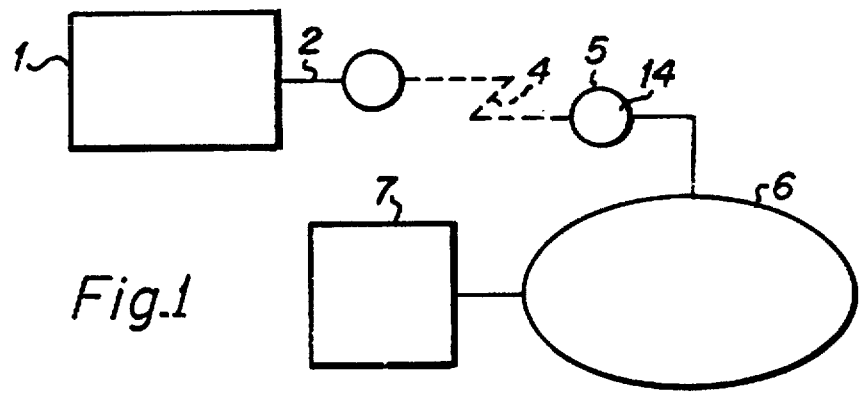
FIG. 1 is a block diagram illustrating the system and method of the present invention in connection with an ATM.

FIG. 1 shows a typical configuration of the components of the present invention. An ATM 1 represents one of a number of commercially available ATM's configured with a 9600 baud modem using a SNA/SDLC (IBM® System Network Architecture/Synchronous Data Link Control) protocol. A digital connector 2 represents an RS 232 electrical interface employing serial binary data interchange between the ATM 1 and an minimum function network access controller (MFNAC) 3, fully described in the discussion of FIG. 2 below. A dial-up telephone connection 4 represents a potential commercial telephone connection through a switched network from the MFNAC 3 to a full function network access controller (NAC) 5 of a commercial computer network service with access to an ATM network 6. A host computer 7 represents the central computer for the ATM 1 having communication with the ATM 1 through the ATM network 6. The NAC 5 has ATM polling response emulation software at its location.

Figure 2:
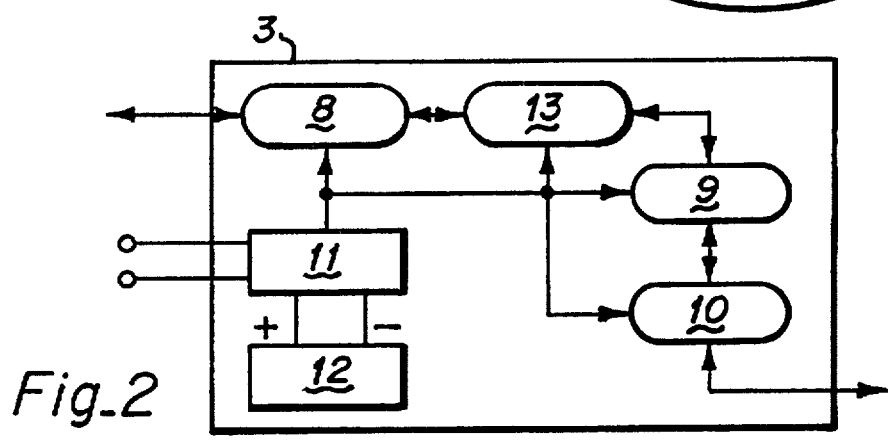
FIG. 2 is a schematic of a minimal function network access controller (MFNAC), a remote network end point.

FIG. 2 shows a schematic of the MFNAC 3. The MFNAC 3 is a Z-80 based network access controller providing the functionality of an SDLC network interface with autodial and network management capabilities. In addition to its support logic, the MFNAC 3 contains 256 k of CMOS RAM (random access memory) and EPROM (erasable, programmable, read only memory). A modem 8 represents a 9600 baud modem in the MFNAC 3 in communication with the 9600 baud modem in the ATM 1 via the digital connector 2. A modem 9 represents a 1200 baud modem in the MFNAC 3 capable of communications with the NAC 5 via a dial-up interface 10. The MFNAC 3 is powered by an external power supply module 11. Auxiliary memory power is maintained by an internal lithium battery 12. The MFNAC 3 communication and dial-up features are driven by software that provides host emulation to the ATM 1, running SNA/SDLC firmware.

Figure 3:
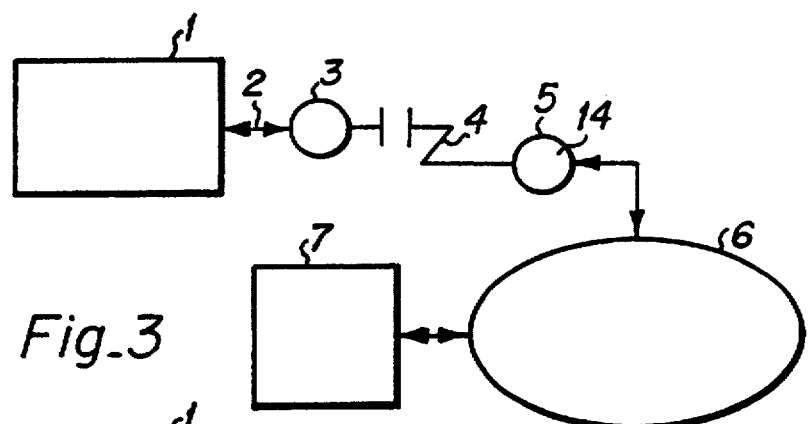
FIG. 3 is a schematic of the communication's traffic and connections in the ATM standby mode of the present invention.

FIG. 3 shows a schematic of the communication's traffic and connections in the ATM ready state of the present invention. A host emulator 13 at the MFNAC 3 sends a periodic "polling" communication to the ATM 1 which responds back to the host emulator 13. An ATM emulator 14 at the NAC 5 responds to periodic "polling" communication from the host computer 7. The host emulator 13 and ATM emulator 14 are software driven. The dial-up telephone connection 4 between the MFNAC 3 and the NAC 5 is not connected.

Figure 4:
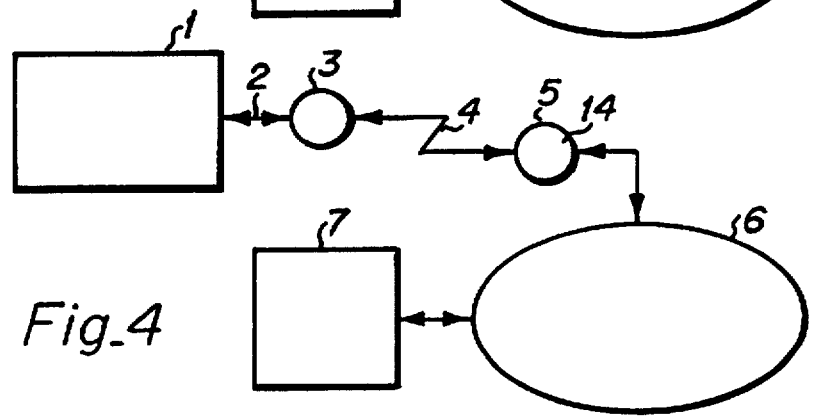
FIG. 4 is a schematic of the communications traffic and connections in the ATM processing mode of the present invention.

FIG. 4 shows a schematic of the communication's traffic and connections in the ATM processing state of the present invention. Processing of actual data between the ATM 1 and the host computer 7 causes the host emulator 13 at the MFNAC 3 and the ATM emulator 14 at the NAC 5 to stand aside, creating a virtual dedicated circuit linking the ATM 1 to the host computer 6 via the switched network. The dial-up telephone connection 4 between MFNAC 3 and NAC 5 is connected after dial-up.

Operation - FIGS. 1, 2, and 3

The present invention has essentially two operational states, ready to process (the ready state) and processing (the processing state). FIGS. 1, 2, and 3 describe the ready state. In the ready state, the host emulator 13 is periodically polling with an electronic signal the ATM 1 to maintain the ready state of the ATM 1. This is achieved by the host emulator 13 replicating the electronic signal demanded by the polling response specification of the ATM 1 and the host emulator 13 receiving the electronic response generated by the ATM 1. Simultaneously, across the open dial-up telephone connection 4, the host computer 7 is periodically polling the ATM emulator 14 to maintain the ready state of the host computer 7. This is achieved by the host computer 7 generating the electronic signal demanded by the polling specification of the ATM 1 and the ATM emulator 14 receiving said signal and responding with an electronic signal duplicative of the poll response specification of the ATM 1.

Communications between the ATM 1 and the MFNAC 3 are continuously maintained between the ATM 1's 9600 baud modem and the MFNAC 3's modem 8 over the hard wire connection provided by the digital connector 2. Communications between the host computer 7 and the NAC 5 are continuously maintained through the ATM network 6 providing such services and functionality.

Operation - FIGS. 1, 2, and 4

FIGS. 1, 2, and 4 describe the processing state of the present invention. Initially, the present invention is in the ready state. An ATM card is inserted into ATM 1 and the client enters his personal identification number (PIN). This data is encrypted at the ATM 1 and is resident in the memory of the ATM 1 for the duration of the transaction. When the host emulator 13 next polls the ATM 1, the presence of client's identification data at the ATM 1 causes the MFNAC 3 to communicate over dial-up telephone connection 4 to the NAC 5, an electronic signal to the ATM emulator 14 to stand aside and permit the next host computer 7 poll to travel to the host emulator 13, which will in turn stand aside, permitting the true host computer 7 poll to be received by the ATM 1. This sequence creates a virtual dedicated circuit linking the ATM 1 to the host computer 7 until the client transactions are concluded. At the conclusion of the client transactions (as defined by operational specifications at the host computer 7), the host computer 7 will resume transmission of polling signals.

The MFNAC 3 controls the duration of the virtual dedicated circuit through a series of timers activated by the absence of communication between ATM 1 and the host computer 7. When any timer is tripped, the MFNAC 3 reactivates the host emulator 13 and the ATM emulator 14 and then terminates the dial-up telephone connection 4.

The MFNAC 13 provides four communication timer intervals (T 1–4). If any of these timers expire, the MFNAC 13 will drop the connection or the connection attempt to the NAC 5. The timer intervals are:

T1=60 seconds. Dial-up to the NAC 5, connect and receive the host computer 7 message within 60 seconds.

T2=15 seconds. On receipt of the host computer 7 message, T2 will cancel T1, T3 or T4 and extend the NAC 5 connection for 15 seconds.

T3=10 seconds. If the status response is sent to the host computer 7 before T2 expires, T3 extends the time remaining in T2 for 10 seconds.

T4=60 seconds. If another customer request is sent to the host computer 7 before T2 expires, T4 will cancel T2 and extend the NAC 5 connection for 60 seconds.

Summary, Ramifications, and Scope

The present invention is unique in providing a method and system for on-demand communications between a remote ATM and a host computer. Such a method and system has heretofore eluded the market place even though economic benefits have generated significant interest and attempts to invent such a system. The present invention is also unique in providing a method and system for on-demand communications that is adaptable to host computers or ATM's or both that demand apparently continuous communications between the host computer and the ATM. This means that ATM emulation or host computer emulation can be provided to the ATM and/or host computer whose functionality demands such apparently continuous communications. Moreover, the present invention is also unique in providing a method and system for joining or adding heretofore incompatible host computer networks through ATM emulation and/or host computer emulation as necessary for compatibility.

The present invention has been described in terms of the presently preferred embodiment using a dial-up telephone connection to provide a non-continuous communications link. Of course, the non-continuous communications link could be provided by many alternative means as demanded by a particular ATM to host computer system including, without limitation, communications via microwave, satellite, cellular, high frequency radio, low frequency radio, etc.

The present invention has been described in terms of the presently preferred embodiment using a standard ATM that provides basic functionality such as data, cash and deposit protection; cash disbursement; deposit acceptance; account balance information; transfers between accounts; stamp purchasing; coupon issuance; etc. Of course, the present invention is compatible with ATMs of less or more functionality. Moreover, the present invention anticipates the increasing functionality of ATMs over time and intends that its operation with such increases in functionality of ATMs be considered as within the scope and spirit of the present invention.

Although the present invention has been described in terms of the presently preferred embodiment, it is to be understood that such disclosure is purely illustrative and not to be interpreted as limiting. Consequently, without departing from the spirit and scope of the invention, various alternations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirits and scope of the invention.

We claim:

1. A system for conducting banking transactions using a remote self-service ATM with on-demand access for the ATM's host computer for ever transaction, said system comprising, (a) an automatic teller machine having the capability of directly dispensing monetary funds, (b) a host computer for the automatic teller machine, and (c) a non-continuous communications link between the automatic teller machine and the host computer, said non-continuous communications link being the primary communications link between said ATM and said host computer.

2. A system a described in claim 1 wherein the non-continuous communications link is a dial-up telephone connection interface.

3. A system for conducting banking transactions using a remote self-service ATM with on-demand access to the ATM's host computer for every transaction, said system comprising, (a) an automatic teller machine having the capability of dispensing monetary funds, (b) a host computer for the automatic teller machine, (c) a non-continuous communications link between the automatic teller machine and the host computer, said non-continuous communications link being the primary communications link between said ATM and said host computer, and (d) a means for emulation of a continuous communications link between the automatic teller machine and the host computer.

4. A system as described in claim 3 wherein the non-continuous communications link is a dial-up telephone connection interface.

5. A system for conducting banking transactions using a remote self-service ATM with on-demand access to the ATM's host computer for every transaction, said system comprising:

(a) an automatic teller machine having the capability of dispensing monetary funds, (b) a host computer for the automatic teller machine, (c) a non-continuous communications link between the automatic teller machine and the host computer, said non-continuous communications link being the primary communications link between said ATM and said host computer, (d) an emulator on the automatic teller machine side of the non-continuous communications link, said emulator emulating to the automatic teller machine a continuous communications link with the host computer, and (e) an emulator on the host computer side of the non-continuous communications link, said emulator emulating to the host computer a continuous communications link with the automatic teller machine.

6. A system as described in claim 5 wherein the non-continuous communications link is a dial-up telephone connection interface.

7. A system as described in claim 5 wherein the automatic teller machine has apparently continuous communications with the host computer.

8. A system as described in claim 5 wherein the host computer has apparently continuous communications with the automatic teller machine.

9. A system for conducting financial transactions using a remote self-service terminal with on-demand access to an ATM host computer for every transaction, said system comprising:
   (a) a remote terminal which includes a communications protocol of an ATM, said remote terminal having the capability of dispensing funds therefrom,
   (b) a host computer for said remote terminal,
   (c) a non-continuous communications link between said remote terminal and the host computer, said non-continuous communications link being the primary communications link between said remote terminal and said host computer, and
   (d) a means for emulation of a continuous communications link between said remote terminal and the host computer.

10. A system as described in claim 9, wherein said means for emulation includes an emulator on the remote terminal side of the non-continuous communications link.

11. A system as described in claim 10, wherein electronic polling communications and electronic responses thereto periodically occur between said remote terminal and said emulator.

12. A system as described in claim 9 wherein said means for emulation includes an emulator on the host computer side of the non-continuous communications link.

13. A system as described in claim 12 wherein electronic polling communications and electronic responses thereto periodically occur between said host computer and said emulator.

14. A system as described in claim 9 wherein said means for emulation includes:
   (e) a first emulator on the remote terminal side of the non-continuous communications link, said first emulator emulating to the remote terminal a continuous communication link with the host computer; and
   (f) a second emulator on the host computer side of the non-continuous communications link, said second emulator emulating to the host computer a continuous communications link with the remote terminal.

15. A system as described in claim 14 wherein host computer electronic polling communications are periodically sent from said remote terminal to said first emulator, and responses thereto are sent from said first emulator to said remote terminal; and wherein ATM electronic polling communications are periodically sent from said host computer to said second emulator, and responses thereto are sent from said second emulator to said host computer.

16. An emulation system for installation within an electronic interconnection between a host computer and a remote terminal having the capability of dispensing funds therefrom, comprising:
   a first emulator for interconnection in electronic communication with said remote terminal;
   a second emulator for interconnection in electronic communication with said host computer;
   said first emulator and said second emulator being electronically adapted for a non-continuous communications link therebetween, said non-continuous communications link being the primary communications link between said first emulator and said second emulator.

17. An emulation system as described in claim 16 wherein said first emulator is adapted to provide electronic signals responsive to polling electronic signals received from said remote terminal.

18. An emulation system as described in claim 16 wherein said second emulator is adapted to provide electronic signals responsive to polling electronic signals received from said host computer.

19. An emulation system as described in claim 16 wherein said first emulator is designed to electronically communicate with said second emulator through said non-continuous communications link upon the receipt of electronic signals from said remote terminal.

20. A method for establishing a non-continuous communications link between a remote terminal having the capability of dispensing funds and a host computer, wherein said remote terminal and said host computer require an apparently continuous communications link there between, comprising the steps of:
   (a) interconnecting a first emulation means with said remote terminal, said first emulation means acting to emulate a host computer;
   (b) interconnecting a second emulation means with said host terminal, said second emulation means acting to emulate a remote terminal;
   (c) establishing a non-continuous communications link between said first emulation means and said second emulation means, said non-continuous communications link being the primary communications link between said first emulation means and said second emulation means.

21. A method as described in claim 20 wherein said first emulation means provides signals to said remote terminal representative of a host computer in continuous communication therewith; and said second emulation means provides electronic signals to host computer representative of a remote terminal in continuous communication therewith.

22. A method as described in claim 20 including the further steps of interconnecting said remote terminal and said host computer in a direct communications mode to establish communication therebetween, said establishment of direct communication mode including the steps of:
   (a) providing a communication between said remote terminal and said first emulation means;
   (b) providing a communication between said first emulation means and said second emulation means;
   (c) providing a communication between said second emulation means and said host computer;
   (d) providing a communication between said host computer and said remote terminal; and
   (e) providing further communications between said remote terminal and said host computer.

\* \* \* \* \*